(12) United States Patent
Wegmaier et al.

(10) Patent No.: US 6,244,847 B1
(45) Date of Patent: Jun. 12, 2001

(54) APPARATUS FOR COOLING AND CALIBRATING EXTRUDED PLASTIC PROFILES

(75) Inventors: Rudolf Wegmaier, Micheldorf; Walter Gugenberger, Gunskirchen; Frank Dorninger, Micheldorf, all of (AT)

(73) Assignee: Technoplast Kunststofftechnik GmbH, Micheldorf (AT)

( * ) Notice: Subject to any disclaimer, the term of this patent is extended or adjusted under 35 U.S.C. 154(b) by 0 days.

(21) Appl. No.: 09/218,175

(22) Filed: Dec. 22, 1998

(30) Foreign Application Priority Data

Dec. 22, 1997 (AT) .................................................. 2171/97

(51) Int. Cl.[7] .................................................. B29C 47/90
(52) U.S. Cl. .................. 425/71; 425/186; 425/326.1; 425/384; 425/388; 425/392
(58) Field of Search .................. 425/71, 186, 326.1, 425/384, 388, 392; 264/209.3, 209.4, 209.5

(56) References Cited

U.S. PATENT DOCUMENTS

| 5,139,402 | * | 8/1992 | Topf ........................................ 425/71 |
| 5,346,379 | * | 9/1994 | Wolfl et al. ............................. 425/67 |
| 5,499,507 | * | 3/1996 | Dorninger ................................ 62/63 |
| 5,505,058 | * | 4/1996 | Dorninger ............................... 62/374 |
| 5,514,325 | * | 5/1996 | Purstinger ............................. 264/560 |

FOREIGN PATENT DOCUMENTS

| 27 34 831 | 12/1978 | (DE) . |
| 27 40 989 | 3/1979 | (DE) . |
| 0 659 536 | 10/1996 | (EP) . |
| 96/364175 | * 11/1996 | (WO) . |

OTHER PUBLICATIONS

Merriam–Webster's Collegiate Dictionary, 10th Edition, p. 1103.*

* cited by examiner

*Primary Examiner*—Tim Heitbrink
*Assistant Examiner*—Donald Heckenberg
(74) *Attorney, Agent, or Firm*—Dykema Gossett PLLC

(57) ABSTRACT

The invention relates to an apparatus for cooling and calibrating extruded plastic profiles with a trough which is provided downstream of a dry calibrating device and has a water bath through which the profile is guided, with plates being arranged in the trough between the face walls in order to calibrate the profile under the influence of negative pressure. In order to achieve a high production speed with a low amount of expenditure it is proposed that a sleeve encompassing the profile is provided in a section of the trough, which sleeve guides at least in a zone of the main body of the profile and that the sleeve is provided with a distance to the face walls in the longitudinal direction.

12 Claims, 3 Drawing Sheets

APPARATUS FOR COOLING AND CALIBRATING EXTRUDED PLASTIC PROFILES

BACKGROUND OF THE INVENTION

The present invention relates to an apparatus for the cooling and calibration of extruded plastic profiles with a trough which is provided downstream of a dry calibrating device and comprises a water bath through which the profile is guided, with apertures being arranged in the trough between the face walls for calibrating the profile.

An installation for the production of plastic profiles as are used for the production of windows or doors usually currently comprises the following arrangement: An extruder produces a profile of doughy consistency made of plastic granulate. One or several dry calibrating devices will cool the profile to a certain extent, so that a somewhat stable form is achieved. Dry calibration substantially consists of a steel block with an opening through which the profile is guided and with a plurality of vacuum slots in order to suck the profile under pressure against the walls of the opening. In this way the collapse of the still soft profile is prevented. Furthermore, several cooling ducts are provided. One or several wet calibrating apparatuses will ensure the final cooling and shaping of the profile. Wet calibrating apparatuses according to the so-called swirl bath principle have proven to be particularly beneficial in the past few years. In such apparatuses the trough is subdivided by calibration plates into several chambers and a turbulent flow of the cooling medium in the trough is caused by openings in the plates. A negative pressure present in the trough will press the profile against the calibration plates. This allows for a precise calibration and rapid cooling of the profile with a lower water consumption. A caterpillar pull-off will draw the profile through the upstream calibrating devices.

The technical progress of extruders and the recipes for profile extrusion has led to continuously rising demands placed on the work speed of extrusion lines. In order to meet these demands it is currently common practice to arrange several dry calibrations behind one another and, downstream of the same, to provide one or several water baths. Dry calibrations are very costly, however, so that for cost reasons a reduction in their number would be desirable.

Calibration systems can be used for slow working extrusion lines which make do with only one single dry calibration with the common length of approx. 300 mm. If in such a system the work speed is increased over a relatively moderate value, high-quality profiles can no longer be produced.

DESCRIPTION OF THE PRIOR ART

From DE 27 40 989 A, a calibration device for plastic profiles is known in which a profile is calibrated and cooled under vacuum in a water bath. A pipe element is attached to the entry-sided face wall of the calibrating trough in order to guide and calibrate the profile after the entry over a certain distance. However, there are unclear pressure situations in the interior of this pipe, so that a close fit of the profile on the tube is not ensured. In particular, the wetting with the cooling water in the space between the profile and the sleeve is not ensured.

Moreover, from DE 27 34 831 A, an extrusion apparatus for pipes is known in which a water bath is provided immediately downstream of a dry calibration apparatus, which water bath is arranged as in the aforementioned specification. It substantially also has the same disadvantages.

SUMMARY OF THE INVENTION

It is the object of the present invention to avoid such disadvantages and, on the one hand, to achieve high production speeds by achieving, on the other hand, a reduction of the required expenditure. In particular, the present invention is to allow making do with only one single dry calibration of the usual length.

These objects are achieved in accordance with the invention that at least one sleeve encompassing the profile is provided in a section of the trough, which sleeve guides at least one zone of the main body of the profile and, that a gap between the profile and the sleeve is in connection with the water bath on either side. Preferably, the sleeve is provided in the longitudinal direction with a distance to the face walls.

It was established that a main cause of the inadequate profile quality in the case of reducing the number of dry calibration apparatuses is that the profiles enter the water bath in a still very hot and therefore soft state. As a result of the negative pressure which prevails by the system in such a wet calibration, the profile is pulled apart in the zones between the calibration apertures, as a result of which inner bridges of the profiles are expanded in an uncontrolled manner. Although the outer contour of the profile is finally brought back again to the desired shape by the calibration apertures, the inner bridges of the profiles are beyond repair. Such profiles can no longer be used in practice.

In the present invention the profile is protected in a first section of the water bath from the attack of the vacuum by the sleeve. As the forces by the vacuum are proportional to the surface area on which they act, a guidance of the profile is mainly required in the zone of the main body.

The relevant aspect in the invention is that the sleeve is in connection with the cooling water at least at either end. This is achieved most easily in such a way that the sleeve is provided at its face sides with a distance to adjacent components such as the face wall of the trough. Apertures in the sleeve can also be provided which secure a continual wetting of the gap between profile and sleeve.

It is particularly favourable if the length of the sleeve is between 100 and 400 mm, preferably between 250 and 320 mm. Particularly in the case when the sleeve is provided with a thin-walled arrangement a further rapid cooling of the profile is achieved by the cooling medium flowing in the outer zone of the sleeve, so that downstream of the sleeve the shape has already stabilised to such an extent that there is no danger of any over-extension of the inner bridges of the profile.

In a particularly favourable embodiment of the invention, a guidance is provided in particular in the zones of the connection of the inner bridges with the outer shape of the profile. In this way the particularly critical parts of the profile are reliably protected.

Preferably, the sleeve is arranged in an upstream area of the trough. Several sleeves can also be provided behind one another. A particularly reliable cooling without endangering the shape of the profile can be achieved in this way with simple means.

It is particularly favourable if the sleeve is held by several plates and if the plates subdivide the trough into chambers in the axial direction of the profile, with apertures being provided in the zone of the sleeves to allow cooling medium to flow through. It can be provided in particular that at one end of the trough there is provided an inlet opening for a cooling medium and at the other end of the trough an outlet opening for a cooling medium, so that the trough is substantially flowed through by a cooling medium in the longitudinal direction. An outstanding cooling effect can be achieved by this solution with a low water consumption.

A particularly simple arrangement of the apparatus in accordance with the invention can be achieved that preferably the sleeve and/or the calibration plates are held movable in a limited manner in one direction transversally to the axial direction of the profile. A complex adjustment of the sleeve and the calibration plates transversally to the axial direction of the profile can thus be omitted. Tensions and a clamping effect, owing to an insufficient adjustment, can thus be securely prevented.

The present invention further relates to a system for the cooling and calibration of extruded plastic profiles with a dry calibration in which the extruded profile is cooled and calibrated by the application of vacuum. In this process one or several troughs are optionally used in which calibration plates are arranged in a water bath.

A particularly precise adjustability and fine-tuning capacity of the calibration is enabled in such a way that a trough equipped with at least one sleeve is provided downstream with a further trough with calibration plates in which there is a lower negative pressure than in the first trough.

It has been seen further that the vacuum in the dry calibration device can be maintained in a particularly favourable manner in that the trough is directly flanged onto the downstream face side of the dry calibrating device, so that the same is directly in contact with the cooling medium. As a result of this embodiment, the power demand of the vacuum pump for the dry calibration is kept low and a stability of the achieved vacuum is reached which has a positive effect on the profile quality.

As a result of the system in accordance with the invention, existing production lines with only one dry calibrating unit can be operated with substantially higher production speeds.

The achievement of the highest possible extrusion speeds is possible in high-performance systems.

BRIEF DESCRIPTION OF THE DRAWINGS

The invention is now explained in closer detail by reference to the embodiments represented in the drawings, wherein.

In the description of the figures, components with a principally similar function are designated in the individual embodiments with the same reference numerals, even if their shape is different.

DETAILED DESCRIPTION OF THE PREFERRED EMBODIMENTS

Figure 1:
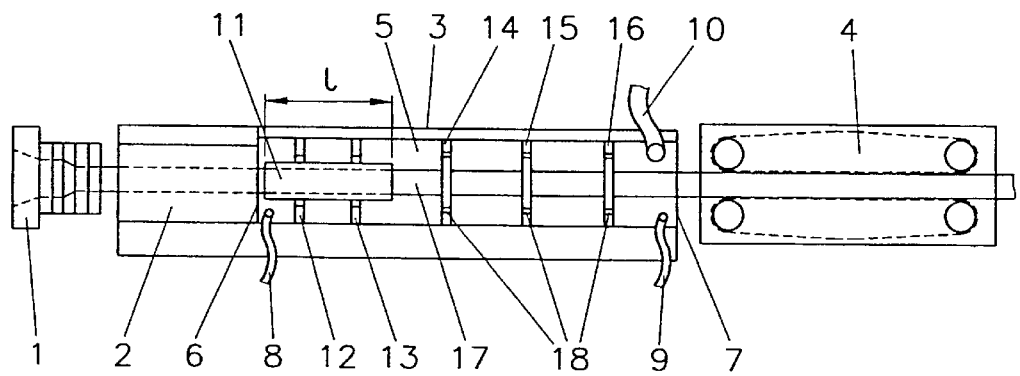
FIG. 1 schematically shows an extrusion line with an apparatus in accordance with the invention.

The extrusion line of FIG. 1 consists of the following components which are arranged successively behind one another: an extruder 1, a dry calibrating device 2, a wet calibrating device 3 and a caterpillar pull-off 4. The wet calibrating device 3 consists of a trough 5 which is flanged directly onto the face wall 6 of the dry calibrating device 2 and which is occluded towards the caterpillar pull-off by a downstream face wall 7. In the upstream zone, cooling water is supplied through a cooling water connection 8, whereas at the other end of the trough 5 the cooling water is discharged from the trough 5 by way of a further cooling water connection 9. A negative pressure is produced in the interior of the trough 5 by way of a vacuum connection 10. In the upstream region of trough 5 a sleeve 11 is arranged which is held by two fixing devices 12, 13. Sleeve 11 is slightly distanced from face wall 6. The length 1 of sleeve 11 is 300 mm, like that of the dry calibrating device 2. Calibrating plates 14, 15, 16 are provided downstream of sleeve 11, which plates calibrate the profile 17 in the known manner. Apertures 18 in the plates 14, 15, 16 are used for producing a turbulent flow of the cooling water, as is described in the European Patent No. 0 659 536.

Figure 2:
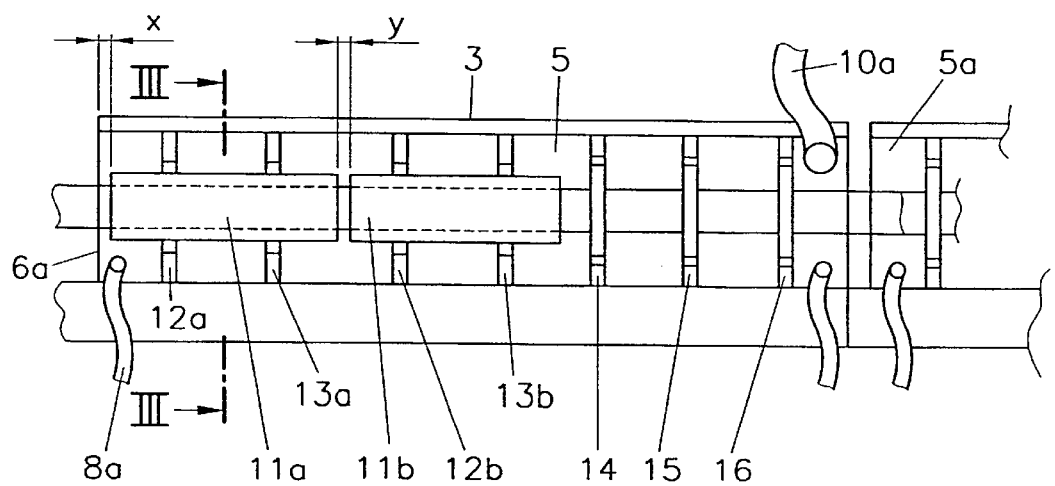
FIG. 2 shows an apparatus in accordance with the invention in a side view on an enlarged scale.

FIG. 2 shows a slightly altered embodiment of the present invention on an enlarged scale. In the embodiment of FIG. 2 the trough 5 is occluded at the upstream end by an own face wall 6a. Two sleeves 11a, 11b are arranged behind one another in trough 5. The sleeves 11a, 11b are held by plates 12a, 13a and 12b, 13b, respectively. The distances x between the face wall 6 and the first sleeve 11a or the distances y between the first sleeve 11a and the second sleeve 11b are sufficiently small with a few millimeters in order to prevent any deformation of the profile as a result of the negative pressure in trough 5.

A further trough 5a is connected on the downstream end of the trough 5 in accordance with the invention, which further trough is arranged in the common manner as a water bath, as is described in the European Patent No. 0 659 536. Said further trough 5a is not subjected to such a high negative pressure as the first trough 5. Depending on the properties of the profile and the other boundary conditions of the calibration, the first trough is set approximately to an absolute pressure of 0.4 to 0.7 bars, whereas a pressure of between 0.6 to 0.8 bars is set in the second trough 5a. Here, the absolute pressure in the second trough 5a is approx. 0.1 to 0.2 bars higher than in the first trough 5.

The embodiment of FIG. 2 is also distinguished from the embodiment of FIG. 1 in that the cooling water is sucked in by way of a first inlet opening 8a. No pump is provided in the zone of said first inlet opening 8a and the negative pressure in trough 5 is used exclusively to cause the inflow. The cooling water stream can be set by way of a regulating apparatus which is not shown. At the downstream side at the end of the trough a second connection 10a is provided which is connected with a regenerative water pump which is not shown here. On the one hand, the required vacuum in trough 5 is produced by way of said connection 10a and, on the other hand, the cooling medium is drawn off. As a result of this design, a strong negative pressure can be produced in trough 5 with relatively simple means. In summary, it is possible by the present invention to achieve an improved profile quality by a stronger evacuation of trough 5 because the profile 17 is pressed more strongly against the sleeves 11a, 11b and the calibration plates 14, 15, 16.

Figure 3:
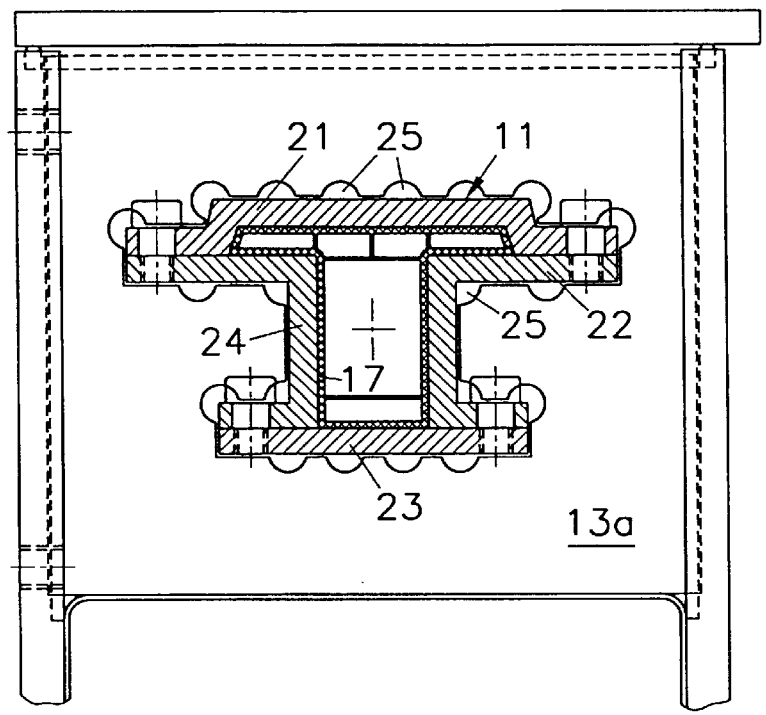
FIG. 3 shows a sectional view according to line III—III in FIG. 2 on an enlarged scale and FIGS. 4 to 6 show altered embodiments in sectional views according to that of FIG. 3.

In the embodiment of FIG. 3, the profile 17 is completely encompassed by sleeve 11. Sleeve 11 consists of the individual components 21, 22, 23 and 24 which are screwed together. Sleeve 11 of FIG. 3 is held floatingly in plates, of which plate 13a is visible in FIG. 3. As a result of this arrangement, the precise position of sleeve 11 is determined by the profile 17, so that an arrangement with precise true alignment of all plates is not required in the production of the apparatus in accordance with the invention. As a result of the slight mobility of sleeve 11 in plate 13a, any slight imprecisions can be compensated without causing any danger of unnecessary deformation of the profile 17 or any jamming. A plurality of recesses 25 is provided between the sleeve 11 which cause a turbulent flow of the cooling water directly on the outer side of the sleeve 11. A particularly intensive cooling of the sleeve 11 is achieved in this way.

Figure 4:
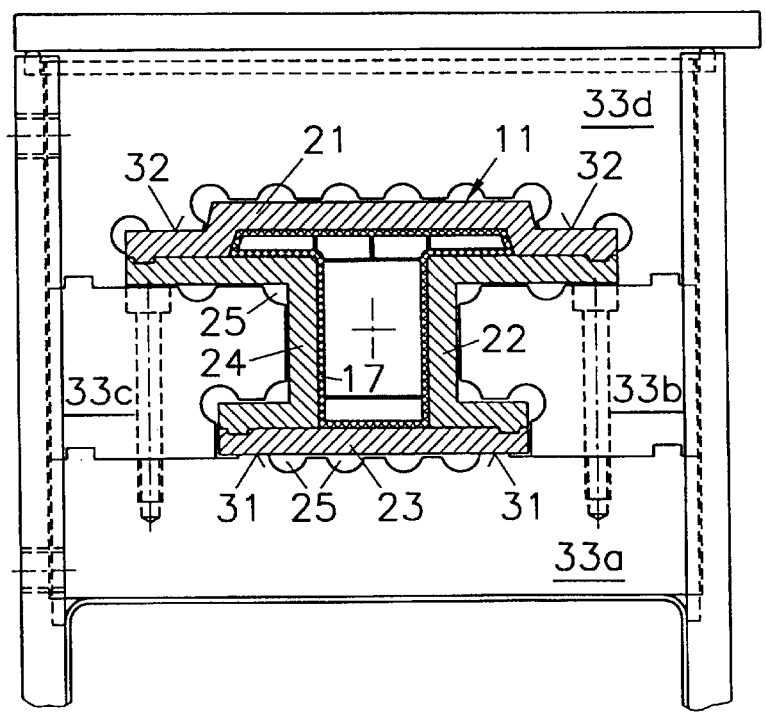

The embodiment of FIG. 4 corresponds substantially to the one of FIG. 3 with the difference that the plate is composed of four single parts 33a, 33b, 33c and 33d so as to allow an installation of the sleeve 11 from above. The sleeve 11 with its individual components 21, 22, 23 and 24 is not screwed together in this embodiment, but is held together by the plate 33a to 33d. A floating mounting is naturally not possible in the vertical direction in this embodiment. Projections 31 in the plate element 33a and 32 in the plate element 33d hold the sleeve 11 in a vertically precisely defined position and press the individual parts 21 to 24 of sleeve 11.

Figure 5:
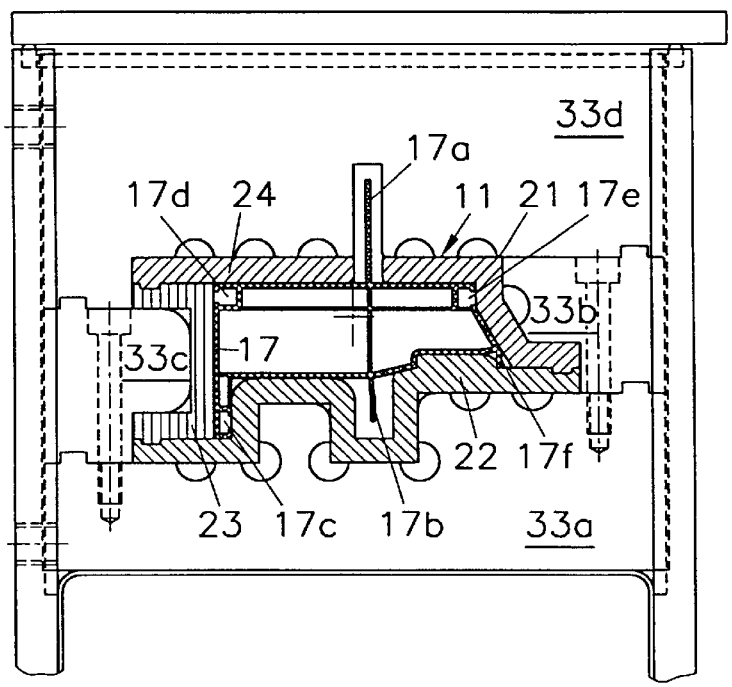

The individual parts 21 to 24 of sleeve 11 are also held together by the plate sections 33a, 33b, 33c and 33d in the embodiment of FIG. 5. The difference in this embodiment is that the sleeve 11 does not completely encompass the profile 17. A first profile projection 17a projects freely upwardly from the sleeve 11. A second profile projection 17b is enclosed with a distance by sleeve 11. Lining grooves 17c, 17d and 17e are placed freely in the inner zone and a free placement is also provided in a corner zone 17f of the profile 17, i.e. a gap between sleeve 11 and profile 17. In this way the friction between profile 17 and the sleeve 11 can be reduced without impairing the efficiency of the present invention. The relevant aspect is that the large-surface wall areas of profile 17 are securely supported by sleeve 11.

Figure 6:
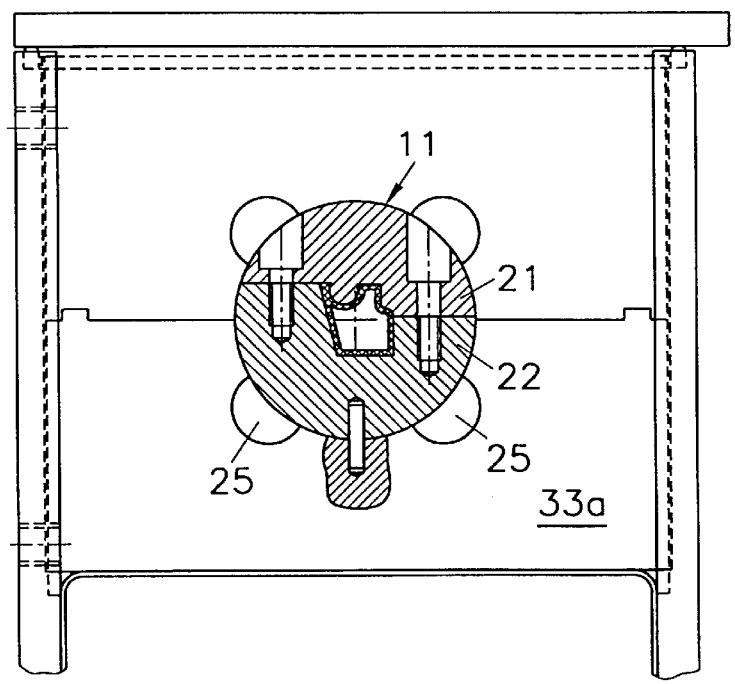

FIG. 6 shows a particularly simple embodiment of the invention which is suitable for small profile cross sections. The inner profile of sleeve 11, which is composed of two components 21 and 22, is eroded into a cylindrical blank. The embodiment of FIG. 6 is arranged in such a way that sleeve 11 is rigidly connected with the lower plate section 33a, with the two parts 11a and 11b of the sleeve 11 being tightly screwed together. It is obvious for the man skilled in the art that this cylindrical sleeve 11 can also be held floatingly.

The present invention allows the highest possible production speed at an extremely inexpensive arrangement of an extrusion line. Already existing tools can be retrofitted in a simple manner in order to achieve a considerably increased production output. As no slots or apertures are provided in the sleeves transversally to the direction of production, a high surface quality is achieved.

Furthermore, an extremely low friction is achieved by a water film between profile and sleeve, which ensures a very low shrinkage. All told, it is possible by the present invention to combine the function of a dry calibration with the simplicity of a swirl bath and to achieve with simple means the highest production output at good quality.

What is claimed is:

1. An apparatus for cooling and calibrating extruded plastic profiles with a trough having face walls and which is provided downstream of a dry calibrating device and comprises a water bath through which the profile is guided, with calibrating plates having a plurality of apertures therein and being arranged in the trough between the face walls in order to calibrate the profile under the influence of negative pressure, said plurality of apertures create turbulance within said trough, wherein a sleeve encompassing the profile is provided in a section of the trough, which the sleeve guides at least a portion of the main body of the profile and that a gap between the profile and the sleeve is in connection with the water bath on either side of the sleeve, and wherein the sleeve is held by several plates, the plates subdivide the trough into chambers in the axial direction of the profile, with openings being provided in the zone of the sleeve for allowing the cooling medium to flow through.

2. An apparatus according to claim 1, wherein the sleeve is provided in the longitudinal direction of the trough with a distance to the face walls.

3. An apparatus according to claim 1, wherein the length of the sleeve is between 100 and 400 mm.

4. An apparatus according to claim 1, wherein the length of the sleeve is between 250 and 320 mm.

5. An apparatus according to claim 1, wherein the sleeve has a wall thickness of between 5 and 10 mm.

6. An apparatus according to claim 1, wherein said sleeve provides further guidance in the zones of the connection of inner bridges with the outer contour of the profile.

7. An apparatus according to claim 1, wherein the sleeve is arranged in an upstream zone of the trough.

8. An apparatus according to claim 1, wherein several sleeves are arranged successively behind one in the trough.

9. An apparatus according to claim 1, wherein an inlet opening for a cooling medium is provided at the one end of the trough and a discharge opening for a cooling medium is provided at the other end of the trough, so that the trough is substantially flowed through in the longitudinal direction by a cooling medium.

10. An apparatus according to claim 1, wherein the sleeve or the calibrating plates are held movable in one direction transversely to the axial direction of the profile.

11. An apparatus according to claim 1, wherein the sleeve completely encloses the profile.

12. An apparatus according to claim 1, wherein in the trough there are provided a first connection for sucking in cooling water and a second connection for sucking in air and cooling water, with a regenerative water pump being connected to the second connection which in addition to the circulation of the cooling water also produces the required vacuum in the trough.

* * * * *